(12) United States Patent
Bejerano et al.

(10) Patent No.: US 7,194,276 B2
(45) Date of Patent: Mar. 20, 2007

(54) METHODS AND DEVICES FOR GROUPING CELLS

(75) Inventors: Yigal Bejerano, Springfield, NJ (US); Nicole S. Immorlica, Cambridge, MA (US); Joseph Naor, Haifa (IL); Mark Anthony Shawn Smith, Jersey City, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 202 days.

(21) Appl. No.: 10/661,670

(22) Filed: Sep. 15, 2003

(65) Prior Publication Data

US 2005/0059404 A1 Mar. 17, 2005

(51) Int. Cl.
*H04Q 7/20* (2006.01)

(52) U.S. Cl. .................. 455/458; 455/405; 455/433; 455/435.1

(58) Field of Classification Search .. 455/435.1–435.3, 455/439, 440, 443, 445, 446, 452.1, 458, 455/406, 405, 422.1, 520, 525, 433
See application file for complete search history.

(56) References Cited

U.S. PATENT DOCUMENTS

| 5,390,234 | A | * | 2/1995 | Bar-Noy et al. | 455/456.1 |
|---|---|---|---|---|---|
| 5,533,094 | A | * | 7/1996 | Sanmugam | 455/426.1 |
| 5,875,400 | A | * | 2/1999 | Madhavapeddy et al. | 455/458 |
| 5,943,621 | A | * | 8/1999 | Ho et al. | 455/456.3 |
| 6,008,704 | A | * | 12/1999 | Opsahl et al. | 332/127 |
| 6,138,025 | A | * | 10/2000 | Lee et al. | 455/453 |
| 6,181,945 | B1 | * | 1/2001 | Lee | 455/456.1 |
| 6,304,746 | B1 | * | 10/2001 | Fascenda et al. | 455/517 |
| 6,859,653 | B1 | * | 2/2005 | Ayoub et al. | 455/406 |
| 6,934,555 | B2 | * | 8/2005 | Silva et al. | 455/522 |
| 6,973,098 | B1 | * | 12/2005 | Lundby et al. | 370/491 |
| 2003/0143999 | A1 | * | 7/2003 | Funato et al. | 455/435 |
| 2004/0165561 | A1 | * | 8/2004 | Chiou et al. | 370/338 |

OTHER PUBLICATIONS

M. Mouly and M. B. Pautet. *The GSM System For Mobile Communication*. Telecom Publishing, France, Jun. 1992.

I. F. Akyildiz, J. McNair, J. S. M. Ho, H. Uzunalioglu, and W. Wang. Mobility management in next generation wireless systems. *IEEE Proceedings Journal*, 87(8):1347-1385, Aug. 1999.

3GPP, Boston, MA, USA and London, UK. *3GPP TS 23.012 V5.0.0, 3rd Generation Partnership Project, Technical Specification Group Core Network, Location Management Procedures (Release 5)*, Mar. 2001.

B. Jabbari, G. Colombo, A. Nakajima, and J. Kulkarni. Network issues for wireless communication. *IEEE Communications Magazine*, 33(1):88-99, Jan. 1995.

R. Steele, J. Whitehead, and W. C. Wong. Network issues for wireless communication. *IEEE Communications Magazine*, 33(1):80-87, Jan. 1995.

S. Okasaka, S. Onoe, S. Yasuda, and A. Maebara. A new location updating method for digital cellular systems. In *Proceeding of the IEEE 41st Vehicular Technology Conference, VTC'41*, pp. 345-350, St. Louis, Missouri, May 1991.

(Continued)

*Primary Examiner*—Jean Gelin
*Assistant Examiner*—Kamaran Afshar

(57) ABSTRACT

Rounded solutions of a linear program are used to partition or group cells, such as cells in a wireless network, in order to provide efficient approximations of network updating and paging costs.

18 Claims, 2 Drawing Sheets

OTHER PUBLICATIONS

P.G. Escalle, V.C. Giner, and J. M. Oltra. Reducing location updates and paging costs in a pcs network. *IEEE Transaction on Wireless Communications*, 1(1):200-209, Jan. 2002.

M. Shirota, Y. Yoshida, and F. Kubota. Statistical paging area selection scheme (spas) for cellular mobile communications systems. In *Proceeding of the IEEE 44th Vehicular Technology Conference, VTC'44*, vol. 1, pp. 367-370, 1994.

S. Mishra and O. K. Tonguz. Most recent interaction area and speed-based intelligent paging in pcs. In *Proceeding of the IEEE 47th Vehicular Technology Conference, VTC'47*, vol. 2, pp. 505-509, 1997.

C. Rose and R. Yates. Minimizing the average cost of paging under delay constraints. *ACM-Baltzer Journal of Wireless Networks*, 1(2):211-219, Jul. 1995.

Y. Bejerano and I. Cidon. Efficient location management based on moving location areas. In *Proceedings of IEEE INFOCOM'01*, pp. 3-12, Anchorage, Alaska, USA, Apr. 2001.

Hai Xie, Sami Tabbane, and David J. Goodman. Dynamic location area management and performance analysis. In *Proceeding of the IEEE 43rd Vehicular Technology Conference, VTC'43*, pp. 536-539, May 1993.

Z. Lei and C. Rose. Wireless subscriber mobility management using adaptive individual location areas for pcs systems. In *IEEE International Conference on Communications, ICC'98*, vol. 3, pp. 1390-1394, 1998.

Z. Lei, C. U. Saraydar, and N. B. Mandayam. Paging area optimization based on internal estimation in wireless personal communication networks. *ACM-Baltzer Journal of Mobile Networks and Applications*, 5(1):85-99, Mar. 2000.

J. Ming-Hui, H. Jorng-Tzong, and H-K. Wu. Personal paging area design based on mobiles moving behaviors. In *Proceedings of IEEE INFOCOM'011*, vol. 1, pp. 21-30, Anchorage, Alaska, USA, Apr. 2001.

S. Tabbane. An alternative strategy for location tracking. *IEEE Journal on Selected Areas in Communications, JSAC*, 13(5):880-892, Jun. 1995.

G. P. Pollini and I. Chih-Lin. A profile-based location strategy and its performance. *IEEE Journal on Selected Areas in Communications, JSAC*, 15(8):1415-1424, Oct. 1997.

S. K. Sen, A. Bhattacharya, and S. K. Das. A selective location update strategy for pcs users. *ACM-Baltzer Journal of Wireless Networks*, 5(5):313-326, Oct. 1999.

A. Bhattacharya and S. K. Das. Lez-update: An information-theoritic approach to track mobile users in pcs networks. In *Proceedings ACM/IEEE MobiCom'99*, pp. 1-12, Seattle, WA, Aug. 1999.

A Bar-Noy, I. Kessler, and M. Sidi. Mobile users: To update or not update? *ACM-Baltzer Journal of Wireless Networks*, 1(2):175-185, Jul. 1995.

I. F. Akyildiz and J. S. M. Ho. Dynamic mobile user location update for wireless pcs networks. *ACM-Baltzer Journal of Wireless Networks*, 1(2):187-196, Jul. 1995.

I. F. Akyildiz, J. S. M. Ho and Y. Lin. Movement-based location update and selective paging for pcs networks. *IEEE/ACM Transactions on Networking, ToN*, 4(4):629-638, Aug. 1996.

I. F. Akyildiz and J. S. M. Ho. A mobile user location update and paging mechanism under delay constrains. *ACM-Baltzer Journal of Wireless Networks*, 1(4):413-425, Dec. 1995.

B. Liang and Z. J. Haas. Predictive distance-based mobility management for pcs networks. In *Proceedings of IEEE INFOCOM'01*, vol. 3, pp. 1377-1384, New York, NY, USA, Mar. 1999.

G. Wan and E. Lin. Cost reduction in location management using semi-realtime movement information. *ACM-Baltzer Journal of Wireless Networks*, 5(2):245-256, Jul. 1999.

Z. Lei and C. Rose. Probability criterion based location tracking approach for mobility management of personal communication systems. In *IEEE Global Telecommunications Conference, GLOBECOM '97*, vol. 2, pp. 977-981, 1997.

V. Wong and V. Leung. Location management for next-generation personal communications network. *IEEE Network*, pp. 18-24, Sep./Oct. 2000.

R. Thomas, H. Gilbert and G. Mazziotto. Influence of the moving of the mobile stations on the performance oa a radio mobile cellular network. In *Proceedings 3rd Nordic Seminar*, Copenhagen, Denmark, Sep. 1998.

E. Alonso, K. S. Meier-Hellstern, and G. P. Pollini. Influence of cell geometry on handover and registration rates in cellular and universal personal telecommunications networks. In *Proceedings 8th Int. Teletraffic Seminar*, pp. 261-270, Genova, Italy, Oct. 1992.

M. Vudali. The location area design problem in cellular and personal communications systems. In *5th IEEE International Conference on Universal Personal Communications*, vol. 2, pp. 591-595, 1999.

Chih-Lin I, Gregory P. Pollini, and Richard D. Gitlin. Pcs mobility management using the reverse virtual call setup algorithm. *IEEE/ACM Transactions on Networking, ToN*, 5(1):13-24, Feb. 1997.

C. U. Sarydar and C. Rose. Location area design using population and traffic data. In *Proceedings of Conference on Information and Science and Systems, CISS 1998*, pp. 739-744, Prinston, NJ, USA, Mar. 1998.

P. R. L. Gondim. Genetic algorithm and the location area partition problem in cellular networks. In *Proceeding of the IEEE 46th Vehicular Technology Conference, VTC'46*, vol. 3, pp. 1835-1838, 1996.

P. Demestichas, E. Tzifa, V. Demesticha, N. Georgantas, G. Kotsakis, M. Kilanioti, M. Striki, M. E. Anagnostou, and M. E. Theologou. Control of the location update and paging signaling load in cellular systems by means of planning tools. In *Proceeding of the IEEE 49th Vehicular Technology Conference, VTC'49*, vol. 4, pp. 2119-2123, 1999.

I. Demirkol, C. Ersoy, M. U. Caglayan, and H. Delic. Location area planning in cellular networks using simulated annealing. In *Proceedings of IEEE INFOCOM'01*, Anchorage, Alaska, Apr. 2001.

J. Plehn. The design of location areas in a gsm-network. In *Proceeding of the IEEE 45th Vehicular Technology Conference, VTC'45*, vol. 2, pp. 871-875, 1995.

I. G. Tollis. Optimal partitioning of cellular networks. In *IEEE International Conference on Communications, ICC'96*, vol. 3, pp. 1377-1381, 1996.

M. Munguia-Macario, D. Munoz-Rodriguez, and C. Molina. Optimal adaptive location area design and inactive locations areas. In *Proceeding of the IEEE 47th Vehicular Technology Conference, VTC'47*, vol. 1, pp. 510-514, 1997.

C. U. Saraydar, O. E. Kelly, and C. Rose. One-dimensional location area design. *IEEE Transactions on Vehicular Technology*, 49(5):1626-1632, Sep. 2000.

M. R. Garey and D. S. Johnson, *Computers and Intractability: A Guide to the Theory of NP-completeness*. Freeman Publication, New York, 1979.

M. M. Deza and M. Laurent. *Geometry of cuts and metrics*. Springer-Verlag, Berlin-Heidelberg, 1997.

V. V. Vazirani. *Approximation algorithms*. Springer-Verlag, 2001.

V. V. Vazirani, N. Garg and M. Yannakakis. Approximate max-flow min-(multi) cut theorems and their applications. *SIAM J. Computing*, 25-235-251, 1996.

S. Plotkin, P. Klein, and S. Rao. Excluded minors, network decomposition, and multicommodity flow. In *Proceeding of the 25th ACM symposium on Theory of Computing*, pp. 682-690, 1993.

E. Tardos and V. V. Vazirani. Improved bounds for the max-flow min-multicut for planar and $k_{r,r}$-free graphs. *Information Processing Letters*, 47:77-80, 1993.

B. Efron and R. J. Tibshirani. *An Introduction to the Bootstrap*. Chapman & Hall, New York, NY, first edition, 1993.

Moses Charikar, Venkatesan Guruswami, and Anthony Wirth. Clustering with qualitative information. *IEEE Symposium on Foundations of Computer Science*, 2003.

Erik D. Demaine and Nicole Immorlica. Correlation clustering with partial information. *Approximation Algorithms for Combinatorial Optimization Problems (APPROX)*, 2003.

Dotan Emmanuel and Amos Fiat. Correlation clustering—minimizing disagreements on arbitrary weighted graphs. *European Symposium on Algorithms*, 2003.

Nikhil Bansal, Avrim Blum, and Shuchi Chawla. Correlation clustinger, *IEEE Symposium on Foundations of Computer Science*, 2002.

* cited by examiner

METHODS AND DEVICES FOR GROUPING CELLS

BACKGROUND OF THE INVENTION

As the name implies, cellular networks are made up of many separate cells. Commonly, cells are grouped into mobile switching center (MSC) domains in order to route calls between individual cells and the remainder of a wireless network (e.g., cellular, Personal Communications System (PCS), etc.). When a user of a wireless device (e.g., cell phone, pager or PDA) moves from one location to another, the network must track her location, or more precisely, the location of her mobile device. Typically, there are thousands of such movements each second in a modern wireless network. A wireless network tracks the number of such movements and associates a network cost to them. This cost is referred to as an updating cost.

While updating costs are associated with tracking the movement of users, other costs, referred to as paging costs, are associated with finding users. For example, when one user sends a call from one wireless network to a user within another wireless network, the receiving network must identify and locate the intended recipient of the call within its many cells. Typically, existing wireless networks send a page to each cell within an MSC where the recipient might be located. For example, if there are 100 cells within an MSC, a typical wireless network will send a page to all 100 cells even though the recipient is located in only one of the cells. The network tracks these pages and assigns a paging cost to each page.

Owners, operators and others involved in wireless networks desire to minimize or reduce the updating and paging costs associated with their networks. To do so, it is desirable to devise techniques which partition or group cells in such a way that both updating and paging costs are minimized. This has been a daunting challenge for it has been thought that even the mathematical statements (i.e., equations), which represent the problem have, heretofore, only been hypothetically solvable using exhaustive searches/iterations (none have actually been completed).

Finding a way to partition cells is a "balancing act" of sorts. Ideally, updating costs could be minimized by limiting the number of so-called "location area boundaries" that a user traverses when she moves from place to place. One way of doing this is to include every cell in one large "location area" (LA). As one might surmise, while this minimizes updating costs, it greatly increases paging costs because the larger the number of cells, the larger the number of pages that must be sent. The reverse is also true (i.e., creating new location areas by removing cells from an original location area may decrease paging costs but increase updating costs).

To date, though some have been able to formulate mathematical equations representing the parameters involved in partitioning cells, none have been able to guarantee that their solutions are efficient.

SUMMARY OF THE INVENTION

The present invention uses a linear program which, after its solutions are rounded, provides an efficient means of partitioning or grouping cells in order to approximate an optimum sum of both updating and paging costs for a wireless network or the like.

DETAILED DESCRIPTION OF THE INVENTION

Figure 1:
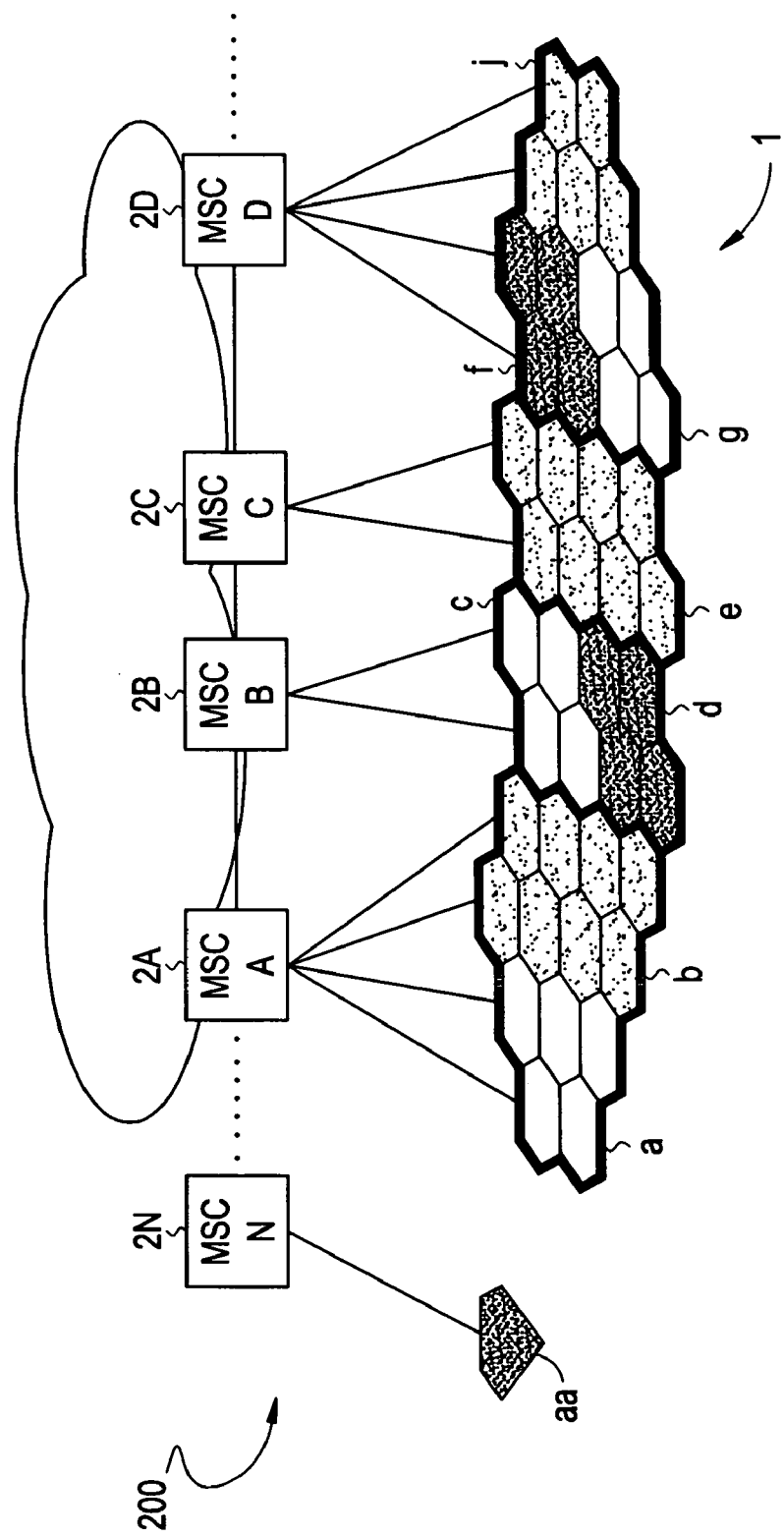
FIG. 1 depicts a simplified view of cells within a wireless network.

Referring to FIG. 1, there is shown a wireless network 1 which comprises cells a–j (where "j" is the last cell in the network). The task at hand is to partition the cells a–j such that the updating and paging costs associated with the operation of wireless network 1 are minimized.

FIG. 1 also shows a second wireless network 200 comprising cell aa. Greatly simplified, the present invention seeks to minimize the sum of the paging costs (which occur, for example, when a user within cell aa attempts to contact a user within wireless network 1) and updating costs (which occur, for example, when a user within network 1 moves from one cell (e.g., cell a) to another cell (e.g., cell b) within network 1).

In one embodiment of the present invention, cells a–j are grouped, clustered or partitioned by: generating a linear program representing a sum of a contribution of each cell a–j to a total paging cost and a total updating cost taking into account some constraints; and assigning each cell to a group (e.g., location area) in accordance with solutions of the linear program.

Having just provided an overview of the present invention, a more detailed explanation will now be presented.

Wireless network 1 may be represented by a graph G(V, E), where V is the set of [V]ertices or nodes of the graph and E is the set of [E]dges. Each vertex represents a cell in the network, and there is an edge or boundary between vertices in the graph if the cells in the network are adjacent. The number of vertices (represented by |V|) equals n and the number of edges |E| equals m. Each vertex has a unique identification number $i \in [1 \ldots n]$ and a weighted value, $w_i$, associated with each cell that reflects each cell's user population (e.g., the number of users which are operating within a given cell during a given period of time, such as rush hour). Every edge, denoted $(i, j) \in E$, has a weighted value, $r_{ij}$, associated with each edge between adjacent cells and which specifies the amount of user traffic between endpoints of each edge in both directions over a given period of time. For completeness sake, $r_{ij}$ is set equal to 0 for every pair of nodes $(i, j) \in V_{(i, j)} \notin E$.

It follows that the weighted value, $w_i$, is representative of the paging cost associated with a cell because any time a call comes in to a user in that cell, some paging must be carried out. Similarly, the weighted value, $r_{ij}$, represents update costs if cells i and j are in different location areas.

Figure 2:
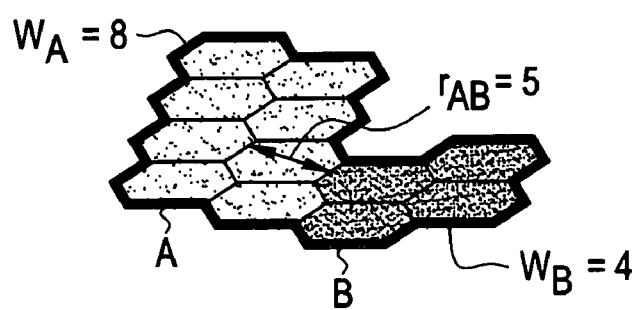
FIG. 2 depicts a simplified view of cells grouped into location areas.

FIG. 2 depicts a greatly simplified illustration of how weighted values $w_i$ and $r_{ij}$ are used. Cells are shown in FIG. 2 grouped into location areas A and B. Location area A is given a weight $w_A$ equal to 8. Again, greatly simplified, this indicates that there are 8 cells within location area A. Location area B is given a weight $w_B$ equal to 4. Suppose further that the number of times a user traverses the boundary or edge between location area A and adjacent location area B is equal to 5 for a given time period, then $r_{AB}=5$.

One way of understanding the values shown in FIG. 2, is to associate each $w_i$ with the number of cells within a location area which may have to be paged. Because there is a greater number of cells within location area A, intuitively it may occur to the reader that the paging costs associated with location area A is higher than location area B; that is correct.

On the other hand, user traffic weight $r_{ij}$ represents the number of times a user passes from one adjacent location area into another. For example, if a user passes from location area A into location area B that amounts to one unit of traffic. Five units of traffic between location area A and location area B indicates that in average five users traverse the edge over a given time period. Perhaps more commonly, when $r_{AB}=5$ this represents five separate traversals of the same edge by five separate users. It should be understood that a user may traverse an edge in either direction, e.g., three users travel from A to B and two users travel from B to A, the total adding up to five units of traffic between the endpoints of the edge represented by the "⇌" in FIG. 2.

The first step in arriving at a solution which has some degree of reliability is to first formulate an expression of the problem which is solvable without the need to resort to exhaustive searches. To that we now turn.

Generally, the paging cost can be defined as:

$$\text{Page\_Cost}(L) = \lambda \cdot C_p \cdot \sum_{S \in L} |S| \cdot \sum_{i \in S} w_i \quad (1)$$

where L is equal to $\{S_1, \ldots, S_k\}$, $\lambda$ denotes a user incoming call rate, and $C_p$ indicates the cost of paging a single cell.

In Equation (1), the paging cost of a single location area having |S| cells is the product of the incoming call rate $\lambda \cdot \sum_{i \in S} w_i$ times the cost of paging all of the cells within every location area, $C_p \cdot |S|$.

Similarly, an updating cost can be defined by:

$$\text{Update\_Cost}(L) = \frac{1}{2} \cdot C_u \cdot \sum_{i \in V} \sum_{j \notin La(i)} r_{ij}. \quad (2)$$

where $C_u$ is the cost of a single update operation and $C_u$ times $r_{ij}$ is the update cost caused by traffic between cells i and j.

In Equation (2), the total updating cost within a wireless network, such as network 1, is the amount of traffic between location areas times $C_u$.

To minimize the overall costs of a wireless network, the sum of the paging costs, represented by Equation (1) and updating costs represented by Equation (2), must be minimized. This can be represented by:

$$\text{Cost}(L_{OPT}) = \min_L \{\text{Update\_Cost}(L) + \text{Page\_Cost}(L)\} \quad (3)$$

As will be understood by those skilled in the art, Equation (1) is a non-linear equation because it contains the product of two variables. The two variables being the size of the location area |S| and the cell weight $w_i$. Consequently, Equation (3) is also non-linear since it contains Equation (1). To formulate a solvable expression it is necessary to convert the non-linear program given by Equation (3) into a linear program.

In one embodiment of the present invention, a linear program is generated from the non-linear program given by Equation (3) in order to provide approximations for the sum of the paging and updating costs. The details of how the present inventors generated a linear program from a non-linear one will be presented in more detail below. Before continuing, however, some additional comments are noteworthy.

In actual wireless networks, geographical considerations and network infrastructure may impose certain size (i.e., size of a location area) and connectivity constraints on the network. These considerations must be taken into account in order to generate a meaningful formulation. For example, because all the cells of a location area are connected to a single MSC (such as MSC 2A, 2B . . . 2N shown in FIG. 1), neither the size nor total population of a location area should exceed the capacity of an MSC.

These size constraints are taken into consideration by introducing two bounds, $K_{max}$ and $W_{max}$, on the maximal cell number and maximal population size of a location area, respectively. For every $S \in L$, it is required that $|S| \leq K_{max}$ and $\sum_{i \in S} w_i \leq W_{max}$. In another embodiment of the present invention, more general constraints bound, for each vertex $i \in V$, the size and weight of a location area containing i, i.e., $|LA(i)| \leq K_i$ and $\sum_{j \in LA(i)} w_j \leq W_i$.

Topological considerations also place constraints on how cells are grouped or clustered into location areas. For example, it may be that certain cells must reside in the same location area or other cells must reside in separate location areas. These constraints are defined by constants, $b_{ij}$, for every pair of cells i, $j \in V$, namely:

$$b_{ij} = \begin{cases} 1 & \text{If } i \text{ and } j \text{ must be in different } LAs; \\ -1 & \text{If } i \text{ and } j \text{ must be in the same } LAs; \text{ and} \\ 0 & \text{Otherwise.} \end{cases}$$

The constants $b_{ij}$ can be represented by a matrix $B=\{b_{ij}\}$. Any location area plan (LAP), denoted by the symbol L, that satisfies both size and connectivity constraints is called a feasible location area plan.

In more detail, a feasible LAP can be generated as follows. Given a graph G(V,E), weights $w_i$ and $r_{ij}$ for every node $i \in V$, edge i, $j \in V$, bounds $K_{max}$, $W_{max}$, and connectivity matrix B, an L can be generated such that, $$\text{Cost}(L) = \min \left\{ \begin{array}{l} \frac{1}{2} \cdot \sum_{i \in V} \sum_{j \notin LA(i)} r_{ij} + \\ \lambda \cdot C_p \cdot \sum_{S \in L} \left( |S| \cdot \sum_{i \in S} w_i \right) \end{array} \right\} \quad (4a)$$

subject to:

$$\forall S_1, S_2 \in L: \quad S_1 \cap S_2 = 0 \quad (4b)$$

$$\forall i \in V: \quad 1 \leq |LA(i)| \leq K_{max} \quad (4c)$$

$$\forall i \in V: \quad \sum_{j \in LA(i)} w_j \leq W_{max} \quad (4d)$$

$$\forall i, j \in V, b_{ij} = 1: \quad LA(i) \neq LA(j) \quad (4e)$$

$$\forall i, j \in V, b_{ij} = -1: \quad LA(i) = LA(j) \quad (4f)$$

In sum, Equations (4a)–(4f) represent a non-linear program which takes into consideration the constraints discussed immediately above. It is Equations (4a–4f) which must be converted into a linear program. Before continuing, it should be noted that the term "linear program" is a term of art known by those skilled in the art of partitioning cells.

Though a software program may eventually be written to carry out the linear program described herein, the two are not synonymous. The present invention seeks to minimize the sum of updating and paging costs using a linear program. The techniques set forth herein to minimize these costs are fundamentally different from existing techniques.

In one embodiment of the present invention, the next step in generating a linear program begins with defining a pair (V, d), where V is a set and d is a non-negative function $d: V_R \times V \to \mathbb{R}$ (called a semi-metric) if and only if d satisfies the following three conditions: (i) $d_{ij}=d_{ji}$ for all i, j∈V (symmetry); (ii) $d_{ii}=0$ for all i∈V; and (iii) $d_i \leq d_{ik}+d_{jk}$ for all i, j, k∉V (triangle inequality).

As provided by the present invention, the function d: $V_R \times V \to \mathbb{R}$ is used to partition a graph representing multiple nodes into location areas. For every pair of nodes, i, j∈V, a variable $d_{ij} \in \{0, 1\}$ is defined, such that, $$d_{ij} = \begin{cases} \text{a first value, e.g., 1, if } i \text{ and } j \text{ belong to different } \textit{LAs}; \text{ or} \\ \text{a second value, e.g., 0, if } i \text{ and } j \text{ belong to the same } \textit{LAs}. \end{cases}$$

Those skilled in the art will recognize that conditions (i) and (ii) from above are met. Condition (iii), which requires triangle inequality, is also met as follows. Consider an assignment to the variables $d_{ij}$ that induces a semi-metric. This assignment defines a partition of the graph into location areas in a natural way. For every node i∈V, the location area containing it, LA(i), is defined by, LA(i)={j|j∈V∧$d_{ij}$=0}, i.e., all nodes that are zero distance from node i. Edges (i, j)∈E for which $d_{ij}$=1 are referred to as cut edges and L denotes the partitioning of LAs induced by variables $d_{ij}$.

Recall the matrix B defined above. It introduces constraints to ensure that a program generates meaningful results (i.e., practical groupings of location areas). In a further embodiment of the present invention, for every pair i, j∈V the constraints $b_{ij} \leq d_{ij}+1$ are applied. If nodes i, j should be in the same location area then $b_{ij}$=−1, and the non-negativity constraint on $d_{ij}$ yields $d_{ij}=b_{ij}+1=0$. Similarly, if nodes i, j are required to be in different location areas then $b_{ij}$=1. Because $d_{ij} \leq 1$, it follows that $d_{ij}=b_{ij}$=1. If nodes i, j are not constrained then $b_{ij}$=0, and $d_{ij} \in \{0, 1\}$.

In one embodiment of the present invention, the paging cost of a wireless network in terms of the variable $d_{ij}$ can be defined as follows:

$$\text{Page\_Cost}(L) = \lambda \cdot C_p \cdot \sum_{i,j \in V} (1-d_{ij}) \cdot w_j \quad (5)$$

where it will be recognized by those skilled in the art that node i is paged whenever there is an incoming call to a user within the location area the node is assigned to, LA(i). Therefore, the network involved performs $$\lambda \cdot \sum_{i,j \in V} (1-d_{ij}) \cdot w_j$$

paging operations over a given time interval.

The updating cost can also be represented in terms of the variable $d_{ij}$ as follows:

$$\text{Update\_Cost}(L) = \frac{1}{2} \cdot C_u \cdot \sum_{i,j \in V} d_{ij} \cdot r_{ij} \quad (6)$$

where the updating cost(s) shown in Equation (6) is simply the cost of the partitioned edges multiplied by the cost of a single updating operation.

Combining Equations (5) and (6) we arrive at a linear program substitute for the non-linear program given by Equation (3), which represents the total cost we are trying to minimize or optimize, namely, $$\min\left\{\lambda \cdot C_p \cdot \sum_{i,j \in V} (1-d_{ij})w_j + \frac{1}{2} \cdot C_u \cdot \sum_{i,j \in V} d_{ij} r_{ij}\right\} \quad (7)$$

In further embodiments of the present invention, before a final linear program can be formulated, size and connectivity constraints must be applied to Equation (7). Recall the bounds $K_{max}$ and $W_{max}$ defined above. In this instance, for each node i∈V, $$LA(i) = \{j \mid j \in V \wedge d_{ij} = 0\}; |LA(i)|$$
$$= \sum_{j \in V} (1 - d_{ij}) \text{ (number of nodes in } LA(i)\text{)},$$

and $$w(LA(i)) = \sum_{j \in V} (1-d_{ij}) \cdot w_j \text{ (weight of nodes in LA(i))},$$

we can enforce the size constraints on each location area by adding for each node i∈V the constraints, |LA(i)|≤$K_{max}$ and w(LA(i))≤$W_{max}$. Equation (7) can be rewritten as follows:

$$\min\left\{\lambda \cdot C_p \cdot \sum_{i,j \in V} (1-d_{ij})w_j + \frac{1}{2} \cdot C_u \cdot \sum_{i,j \in V} d_{ij} r_{ij}\right\} \quad (8a)$$

subject to:

$$\forall i, j, k \in V: \quad d_{ij} + d_{jk} \geq d_{ik} \quad (8b)$$

$$\forall i, j \in V: \quad b_{ij} \leq d_{ij} \leq b_{ij} + 1 \quad (8c)$$

$$\forall i \in V: \quad \sum_{j \in V} (1-d_{ij}) \leq K_{max} \quad (8d)$$

$$\forall i \in V: \quad \sum_{j \in V} (1-d_{ij})w_i \leq W_{max} \quad (8e)$$

$$\forall i, j \in V: \quad d_{ij} \in \{0, 1\} \quad (8f)$$

In a further embodiment of the present invention, Equations (8a)–(8f) represent a linear program which can eventually be used to generate (i.e., partition) cell clusters or groups that can be used to derive efficient approximations of the sum of paging and updating costs. More specifically, given the restriction placed on $d_{ij}$ by Equation (8f) (i.e., that it must be a 1 or 0), Equations (8a)–(8f) can be said to represent a linear, integer program.

Before continuing, it should be noted that the linear, integer program given by Equations (8a)–(8f) may be used in applications other than wireless communications. Any application which requires the partitioning of a graph (as that term is known by those in the art) using at least two parameters (e.g., cell edges/boundaries and cell size/properties) may make use of Equations (8a)–(8f).

Though the formulation of a linear, integer program is a novel accomplishment all by itself, more is needed before solutions can be generated and cells partitioned/grouped. Equations (8a)–(8f) are still considered very difficult to solve (so-called "NP hard"). More specifically, they would still require exhaustive searches or iterations to solve. In a further embodiment of the present invention, the restrictions placed on the linear integer program by Equation (8f) may be relaxed to allow approximate solutions to be generated in polynomial time (i.e., without exhaustive searches).

In a further embodiment of the present invention, the restrictions placed on the linear program by Equation (8f) may be relaxed to allow for fractional solutions, i.e., we only require that for all $i$, $j \in V$, $d_{ij} \in [0,1]$. The linear program generated by the present invention contains only $O(n^2)$ variables and $O(n^3)$ constraints. As will be recognized by one skilled in the art, the value of an fractional solution is a lower bound on the value of an optimal integral solution.

Though the generation of fractional solutions allows the linear program represented by Equations (8a)–(8f) to be solved without the need for an exhaustive search, once the fractional values are generated they must be used to partition cells or more specifically, to assign a cell to one or more location areas.

In yet a further embodiment of the present invention, the fractional values are rounded into integer values (e.g., 1 or 0) in order to so partition or assign each cell.

In one embodiment of the present invention, one of many techniques which may be used to round fractional values into integers is referred to as a region growing (sometimes called "ball growing") technique.

Some notation useful in understanding such a technique is as follows. A ball $b(i, r)$ of radius $r$, i.e., a subgraph induced by these nodes, and a function $(r-d_{ij})/d_{jk}$ having edges $(i, k)$ with only one endpoint $j \in b(i, r)$ (note that $d_{ij}$ is defined for all nodes $(i, j)$). A cut, $\delta(S)$, of a set of nodes $S$ is the set of edges with precisely one endpoint in $S$. A weight of $\delta(S)$, cut(S), is defined to be $$\sum_{|\{i,j\} \cap S|=1} T_{ij}.$$

The cut of a ball is the cut induced by the set of vertices included in the ball. The volume, vol(S), of a set of nodes S is the weighted distance of the edges with both endpoints in S, i.e.

$$\sum_{\{i,j\} \in S} T_{ij} d_{ij}.$$

Finally, the volume of a ball is the volume of $b(i, r)$ including the fractional weighted distance of edges leaving $b(i, r)$. In other words, if $(j, k)$ is a cut edge of ball $b(i, r)$ with $j \in b(i, r)$, then $(j, k)$ contributes $r_{jk} \times (r-d_{ij})$ weight to the volume of ball $b(i, r)$. For reasons known to one skilled in the art, an initial volume (seed) I is also included to the volume of every ball (i.e. ball $b(i, 0)$ has volume I).

In one embodiment of the present invention, rounding is carried out by first generating a graph $G(V, E)$, $|V|=n$, having fractional assignment to the variables $d_{ij}$ obtained from the linear program. Next, suppose the volume of the entire graph is $$F = \frac{1}{2} \sum_{i,j \in V} d_{ij} r_{ij},$$

where the updating cost of the fractional solution is represented by $C_u F$. If the initial volume of the balls is $F/n$, balls are iteratively grown around arbitrary nodes of the graph until the cost of the cut is at most $c \ln(n+1)$ times the cost of the volume. A location area is then generated, consisting of the nodes in this ball. The nodes are then removed from the graph, and the process is repeated.

Table 1 summarizes the steps used to round fractional values generated by the linear program into integer values.

TABLE 1

Round (G(V,E), {$d_{ij}$}):

// Variable Initialization.
H → G
L ← 0
// Main loop
while ∃ a node i ∈ H
  S ← 0
  r ← 0
  // Grow ball
  repeat
    S ← S ∪ b(i, r)
    r ← r + Δ
  until cut weight (b(i, r)) ≦ cln(n + 1) · vol(b(i, r))
  L ← L ∪ S
end It should be noted that the order in which the nodes are considered is indeed arbitrary. That said, the present invention can also be applied to a heuristic that chooses an order in a particular manner, as follows.

In a further embodiment of the present invention, suppose c is some constant which will be determined later, and $\delta = \min\{(d_{ij}-r): j \notin b(i, r), (d_{ij}-r) > 0\}$ is the remaining distance to the nearest vertex (among those with distance greater than zero) outside the current ball, then the process will terminate in polynomial time with a solution L that satisfies a set of constraints, and have a cost which is not much more than the fractional volume F.

It should be noted that the termination condition on region-growing guarantees an $O(\log n)$ approximation to the updating component.

Let α=cln(n+1), then $$\text{Update\_Cost}(L) = \frac{1}{2}C_u \sum_{\text{balls } b} \text{cut}(b) \leq \frac{1}{2}C_u \alpha \sum_{\text{balls } b} \text{vol}(b) \leq$$

$$\frac{1}{2}C_u \alpha \left( \frac{1}{2} \sum_{i,j \in V} d_{ij} r_{ij} + \sum_{\text{balls } b} \frac{F}{n} \right) \leq$$

$$\frac{1}{2}C_u \alpha (2F) \leq C_u \alpha F$$

where the second line follows from the fact that balls found by the algorithm are disjoint. Note also that $C_u F$ is precisely the updating cost of the fractional solution.

It can also be seen that the balls have radius at most 1/c. This fact follows from the following known lemma.

Lemma: For any vertex i and family of balls b(i, r), the condition cut (b(i, r))≦cln(n+1)×vol(b(i, r)) is achieved for some r≦1/c.

Proof: We proceed by contradiction. We first set α=cln (n+1). Next, the ball is grown continuously from r=0 to r=1/c, and suppose throughout this process, cut(b(i, r))>α× vol(b(i, r)). The incremental change in the volume becomes:

$$d(\text{vol}(b(i, r))) = d\left( \sum_{j,k \in b} r_{jk} d_{jk} + \sum_{j \in b, k \notin b} r_{jk}(r - d_{ij}) \right)$$

$$= \sum_{j \in b, k \notin b} d(r_{jk}(r - d_{ij}))$$

$$= \sum_{j \in b, k \notin b} r_{jk} dr$$

$$= \text{cut }(b(I, r)) dr$$

$$= \alpha \text{vol}(b(i, r)) dr$$

by assumption. The initial volume of a ball is, by definition, F/n, and the final volume is at most F+F/n if the ball covers the entire graph. Therefore, $$\int_{F/n}^{F+F/n} \frac{1}{\text{vol}(b(i, r))} d(\text{vol}(b(i, r))) >$$

$$\int_0^{1/c} \alpha\, dr \text{ and so } \ln(n+1) > \frac{1}{c}\alpha = \ln(n+1).$$

In an additional embodiment of the present invention, the rounded paging cost is bounded by:

$$\text{Page\_Cost}(L) = \lambda C_p \sum_{\text{balls } b} \sum_{i,j \in b} w_j$$

$$= \frac{c}{c-2} \cdot \lambda C_p \sum_{\text{balls } b} \sum_{i,j \in b} (1 - 2/c) w_j$$

where $$\lambda C_p \sum_b \sum_{i,j \in b} (1 - 2/c) w_j$$

is a lower bound on the paging cost of a fractional because the radius of the balls is at most 1/c and, therefore, by the triangle inequity $1-d_{ij} \geq 1-2/c$ for any nodes i and j that belong to the same ball. In an additional embodiment of the present invention, this implies that our solution applies a $$\frac{c}{c-2}$$

approximation to the paging cost.

In yet a further embodiment of the present invention, a final approximation factor is the maximum approximation factor of the two components, namely:

$$\max\left( c\ln(n+1), \frac{c}{c-2} \right) = O(\log n) \tag{9}$$

It can be shown that Equation (9) satisfies size constraints as well. More specifically, Equation (9) represents a pseudo-approximation. A pseudo-approximation gives an approximate solution to a problem with slightly different parameters. In this case, the size bound parameters, $K_{max}$ and $W_{max}$, are perturbed slightly. Specifically, a set of location areas are generated such that each location area has size at most $$\frac{c}{c-2} K_{max}$$

and weight at most $$\frac{c}{c-2} W_{max}.$$

Proof of the first of these statements is as follows. (Proof of the second is similar.) Because we know that $\forall i \in V: \Sigma_{j \in V}(1-d_{ij}) \leq K_{max}$. Fix i, therefore, $$\frac{c}{c-2} K_{max} \geq \frac{c}{c-2} \sum_{j \in V} (1 - d_{ij})$$

$$\geq \frac{c}{c-2} \sum_{j \in LA(i)} (1 - d_{ij})$$

$$\geq \frac{c}{c-2} \sum_{j \in LA(i)} \left(1 - \frac{2}{c}\right)$$

$$= \sum_{j \in LA(i)} 1$$

The last term is the size of LA(i). Note that c is an arbitrary constant. The larger c is, the closer the solutions are to true size bounds. However, if the approximation factor grows like cln(n+1), overall costs may increase. The tradeoff is between being close to the size constraint on the one hand and having a better overall cost on the other. It should also be noted that if the bounds $K_{max}$ and $W_{max}$ are not specified (i.e. can be arbitrarily large), then the techniques presented above can be viewed as exact approximations.

In still further embodiments of the present invention, rounding can be carried out with more general size and weight constraints. For example, constraints for each vertex $i \in V$ on the size and weight of a location area containing i, i.e., $|LA(i)| \leq K_i$ and $$\sum_{j \in LA(i)} w_j \leq W_i$$

may be applied. This requires adding many constraints exponentially to a linear program for each node i which force subsets containing i that exceed $K_i$ and $W_i$ bounds to have some large $d_{ij}$. The rounding techniques set forth above guarantee that no location area has a large diameter. Therefore, it can be assumed that large subsets will be subdivided.

Though the above discussion has focused on a few rounding techniques, it should be understood that others may be used without departing from the spirit or scope of the present invention.

The above discussion has also assumed that cells to be grouped, partitioned or clustered do not form a special cluster referred to as a "line" graph.

If, however, cells can be formed into a line cluster, then the present invention is also capable of generating optimal or minimum costs associated with these special types of cell clusters.

For example, many times wireless networks are constructed along interstate highways or the like. It turns out that many of the cells form a line cluster. Economically, it is sometimes better to treat such clusters separately. In an alternative embodiment of the present invention, the network costs associated with a line cluster can be given by:

$$Cost(i) = \min_{q=1}^{i} \left\{ \begin{array}{l} \lambda \cdot C_p \cdot |i-q+1| \cdot \sum_{j=q}^{i} w_j + \\ C_u \cdot r_{q-1,q} + Cost(q-1) \end{array} \right\} \quad (10)$$

The generation of costs using Equation (10) is based on the following assumptions and explanation.

A line is formally defined as a graph where exactly two nodes have "degree 1", where the degree of a node is the number of edges that have an end-point at that node, and the remaining nodes have degree 2. Consider a line G(V, E), connectivity matrix B and size bounds $K_{max}$ and $W_{max}$. Assume further that line nodes are indexed adjacently in increasing order from 1 to n, i.e., for every i, j, $r_{ij} > 0$ and $b_{ij} \neq 0$ only if $|i-j|=1$. The cost of the optimal LAP on the line graph $G_i$ induced by the first i nodes, $[1 \ldots i] \in V$ is denoted by Cost(i), where Cost(0)=0 is the cost of an empty line.

Cost(i) (and the actual LAP itself) can be computed recursively. For example, suppose the optimal LAP in a graph $G_i$ is $\{S_1, \ldots, S_k\}$ for some k. Let q be the index of the left border node in $S_k$ (i.e., the node with the lowest index in $S_k$). Then the optimal LAP for $G_{q-1}$ must have the same cost as $\{S_1, \ldots, S_k\}$ or else $\{S_1, \ldots, S_k\}$ would not be optimal for $G_i$. Thus, Cost(i) is the sum of Cost(q-1) and the cost incurred by $S_k$ is that given by Equation (9).

In yet another embodiment of the present invention, cells in a line may be grouped using a dynamic program representing a sum of weighted values associated with each cell and each edge between adjacent cells, and grouping constraints. Cells are then assigned to a group based on solutions of the dynamic program. Dynamic programming techniques are known by those skilled in the art.

The dynamic program provided by the present invention provides an optimal LAP for a line graph in time $O(n^2)$, where n is the number of nodes in the line. First, the Cost(i) for i from 1 to n is calculated and the result of each iteration is stored in a table so it may be used in the next iteration. In addition, the sum of weights is also stored to avoid an extra factor of n in run time.

As before, connectivity and size constraints must be taken into consideration. Connectivity constraints $b_{ij}=1$ split the line graph into multiple line graphs. Connectivity constraints $b_{ij}=-1$ simply forces nodes to be in same location area.

Size constraints are easily accommodated as well. As an example, consider the maximal LA size constraint $K_{max}$ (the weight constraint $W_{max}$ is analogous). When $\alpha = \max\{1, i - K_{max}+1\}$, the size constraint forces the border node q to be amongst nodes $\alpha, \ldots, i$, and so the minimization in Equation (10) is just taken over this range.

Table 2. summarizes the steps involved in generating location area groups for a line ignoring connectivity constraints.

TABLE 2

```
//Variable Initialization.
C[0] = 0
L[0] = 0
f_{0,1} = 0
    //Main loop from 1 to n.
for i = 1 to n do
    C[i] = ∞
        //Updating the max weight of LA LA(i).
        α = max {1, i − K_max + 1}
        W_LA = Σ_{j=α}^{i} w_j
        //Loop for checking all border nodes.
        for q = α to i do
            //Checking if q can be a border node.
            if b_{q−1,q} = 0 then
                tmp = λ · C_p · (i − q + 1) · W_LA +
                      + C_u · f_{q−1,q} + C[q − 1]
                if tmp <C[i] then
                    //A less expensive LAP was found.
                    C[i] = tmp
                    L[i] = L[i] = L[q−1] ∪ {{q..ii}}
                end-if
            end if
            W_LA = W_LA − w_q
        end-for
    end for
    return C[n], L[n]
end
``` where L and C are two arrays that store the optimal LAP and its cost for the segment $[1 \ldots i]$, respectively and where the variable $W_{LA}$ records the total weight of the nodes q, . . . , i initialized by $$W_{LA} = \sum_{j=\alpha}^{i} w_j,$$

and decreased by $w_q$ before increasing a border node index, q.

Given a line G(V, E), connectivity matrix B and maximal LA size $K_{max}$, an optimal LAP of G(V, E) and its cost can be determined for a line.

For an empty line without nodes there are no paging or updating costs and its total cost is Cost[0]=0. In an additional embodiment of the invention, the cost of different solutions is calculated when each one of the feasible border nodes q of LA(i) (the last max $\{1, I-K_{max}1\}$ nodes of the line), is checked using the equation, $$\lambda \cdot C_p \cdot (i-q+1) \cdot W_{LA} + C_u \cdot r_{q-1,q} + C[q-1]  \quad (11)$$

By inductive assumption, C[q], q<i, can be shown to be the cost of the optimal LAP for the line graph induced by nodes [1 .. q]. Therefore, the cost of the optimal LAP can be generated when a given node q is forced to be a border node of LA(i). Because the minimum of these values is used over all feasible border nodes q, both the optimal LAP and its cost can be generated.

The above discussion has presented some examples of the present invention. Further examples may be envisioned by those skilled in the art. For example, one or more of the functions, steps or processes discussed above may be carried out by one or more programmed devices (e.g., computer, microprocessor, etc. and/or associated memory devices, hard drives, floppy discs, etc. using software, firmware, etc.). The scope of the present invention is, however, defined by the claims which follow.

We claim:

1. A method for grouping cells within a wireless telecommunication network comprising:

generating a sum of weighted values associated with each cell within the wireless network, which represent a paging cost, and each edge between adjacent cells within the wireless network, which represent an updating cost, and grouping constraints; and assigning a cell to a group based on the weighted value sums to route calls from the assigned cell.

2. The method as in claim 1 wherein the generation of the weighted value sums produces fractional values.

3. The method of claim 2 further comprising rounding the fractional values into integer values.

4. The method as in claim 3 further comprising rounding the fractional values using region growing.

5. The method as in claim 3 wherein rounding further comprises using a variable, where the variable equals:

a first value, if elements i and j belong to different groups, or a second value, if i and j belong to the same group.

6. The method as in claim 5 wherein the first value equals 1 and the second value equals 0.

7. The method as in claim 3 further comprising approximating costs associated with updating and paging operations of one or more wireless networks from the rounded values.

8. The method as in claim 1 wherein the group comprises a location area associated with one or more wireless networks.

9. A method for grouping cells within a wireless telecommunication network comprising:

generating a sum of weighted values associated with each cell in a line within the wireless network, which represent a paging cost, and each edge between adjacent cells in a line within the wireless network, which represent an updating cost, and grouping constraints; and assigning a cell to a group based on the weighted value sums to route calls from the assigned cell.

10. A computer readable medium encoded with a computer program for grouping cells within a wireless telecommunication network operating to:

generate a sum of weighted values associated with each cell within the wireless network, which represent a paging cost, and each edge between adjacent cells within the wireless network, which represent an updating cost, and grouping constraints; and assign a cell to a group based on the weighted value sums to route calls from the assigned cell.

11. The computer readable medium as in claim 10 wherein the generation of the weighted value sums produces fractional values.

12. The computer readable medium of claim 11 further operating to round the fractional values into integer values.

13. The computer readable medium as in claim 12 further operating to round the fractional values using region growing.

14. The computer readable medium as in claim 12 further operating to round the fractional values using a variable, where the variable equals:

a first value, if elements i and j belong to different groups, or a second value, if i and j belong to the same group.

15. The computer readable medium as in claim 14 wherein the first value equals 1 and the second value equals 0.

16. The computer readable medium as in claim 12 further operating to approximate costs associated with updating and paging operations of one or more wireless networks from the rounded values.

17. The computer readable medium as in claim 10 wherein the group comprises a location area associated with one or more wireless networks.

18. A computer readable medium encoded with a computer program for grouping cells within a wireless telecommunication network operating to:

generate a sum of weighted values associated with each cell in a line within the wireless network, which represent a paging cost, and each edge between adjacent cells in a line within the wireless network, which represent an updating cost, and grouping constraints; and assign a cell to a group based on the weighted value sums to route calls from the assigned cell.

* * * * *